US008110735B2

(12) United States Patent
Watanabe et al.

(10) Patent No.: US 8,110,735 B2

(45) Date of Patent: Feb. 7, 2012

(54) EFFECT SETTING DEVICE SYSTEMS AND METHODS

(75) Inventors: Yasuyuki Watanabe, Hamamatsu (JP); Taishi Uchimiya, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 295 days.

(21) Appl. No.: 12/353,180

(22) Filed: Jan. 13, 2009

(65) Prior Publication Data

US 2009/0178546 A1 Jul. 16, 2009

(30) Foreign Application Priority Data

Jan. 16, 2008 (JP) ................................ 2008-007436

(51) Int. Cl.
*G01P 3/00* (2006.01)

(52) U.S. Cl. ........................................................ 84/626

(58) Field of Classification Search ..................... 84/626
See application file for complete search history.

(56) References Cited

U.S. PATENT DOCUMENTS

2008/0053293 A1* 3/2008 Georges et al. ................. 84/609
2008/0071831 A1* 3/2008 Reddy ........................ 707/104.1
2009/0319518 A1* 12/2009 Koudas et al. .................... 707/5

FOREIGN PATENT DOCUMENTS

JP 04-264680 9/1992
JP 10-11343 1/1998
JP 2000-231380 8/2000

* cited by examiner

*Primary Examiner* — Jianchun Qin
(74) *Attorney, Agent, or Firm* — Foley & Lardner LLP

(57) ABSTRACT

A first control may be for setting a patch including one or more types of effects to be provided by circuitry to an inputted music signal, the patch associated with multiple candidate keywords to be displayed by a display device. A second control may be for assigning a patch name including a candidate keyword from the multiple candidate keywords to the patch. A storage device may be for storing the patch name and the patch. The one or more types of effects may be provided to the inputted music signal based on the patch stored in the storage device.

21 Claims, 8 Drawing Sheets

| | Effect name | Parameter name | Setting value (Name) | |
|---|---|---|---|---|
| 51 | Overdrive/Distortion | Switch | Off, On | 51a |
| | | Type | Overdrive (OVD), Distortion (DIST), Fuzz (FUZZ) | 51b |
| | | Drive | 0 ~ 100 | 51c |
| | | Tone | 0 ~ 100 | 51d |
| | | Level | 0 ~ 100 | 51e |
| 52 | Amp simulator | Switch | Off, On | 52a |
| | | Type | Clean (Clean), Crunch (Crunch), Lead (Lead), Custom | 52b |
| | | Gain | 0 ~ 100 | 52c |
| | | Bass | 0 ~ 100 | 52d |
| | | Middle | 0 ~ 100 | 52e |
| | | Treble | 0 ~ 100 | 52f |
| | | Custom type | Combo (Comb), Stack (Stack), Small (Small) | 52g |
| | | Parameter 1 | 0 ~ 100 | 52h |
| | | Parameter 2 | 0 ~ 100 | 52i |
| 53 | Pedal | Type | Volume, Wah (WAH) | 53a |
| | | Minimum | 0 ~ 100 | 53b |
| | | Maximum | 0 ~ 100 | 53c |
| 54 | FX | Switch | Off, On | 54a |
| | | Type | Phaser (PHAS), Flanger (FLAN), Tremolo (TREM) | 54b |
| | | Parameter 1 | 0 ~ 100 | 54c |
| | | Parameter 2 | 0 ~ 100 | 54d |
| 55 | Delay | Switch | Off, On (DELAY) | 55a |
| | | Delay time | 0msec ~ 2000msec | 55b |
| | | Level | 0 ~ 100 | 55c |
| 56 | Chorus | Switch | Off, On (CHOR) | 56a |
| | | Rate | 0 ~ 100 | 56b |
| 57 | Reverb | Switch | Off, On (REV) | 57a |
| | | Type | Room (ROOM), Hall (HALL), Plate (PLATE) | 57b |
| | | Time | 0.1sec ~ 10.0sec | 57c |
| 58 | Equalizer | Switch | Off, On | 58a |
| | | Low | -20dB ~ 0dB ~ +20dB | 58b |
| | | Middle | -20dB ~ 0dB ~ +20dB | 58c |
| | | High | -20dB ~ 0dB ~ +20dB | 58d |
| 59 | Compressor/Limiter | Switch | Off, On | 59a |
| | | Type | Compressor, Limiter | 59b |
| | | Sustain | 0 ~ 100 | 59c |
| | | Attach | 0 ~ 100 | 59d |
| | | Threshold | 0 ~ 100 | 59e |
| | | Release | 0 ~ 100 | 59f |

Fig. 3

Keyword list

| | |
|---|---|
| 1 | DIST |
| 2 | CLEAN |
| 3 | NULL |
| 4 | PHAS |
| 5 | DELAY1800 |

Fig. 4(a)

Keyword list

| | |
|---|---|
| 1 | NULL |
| 2 | NULL |
| 3 | NULL |
| 4 | NULL |
| 5 | DELAY 200 |
| 6 | DELAY L55 |
| 7 | CHOR R70 |
| 8 | REV PLATE |
| 9 | REV T1.2 |

Fig. 4(b)

EFFECT SETTING DEVICE SYSTEMS AND METHODS

CROSS-REFERENCE TO RELATED PATENT APPLICATIONS

Japan Priority Application 2008-007436, filed Jan. 16, 2008 including the specification, drawings, claims and abstract, is incorporated herein by reference in its entirety.

BACKGROUND OF THE INVENTION

1. Field of the Invention

Embodiments of the present invention generally relate to effect setting device systems and methods for providing multiple types of effects to a musical note, and, in specific embodiments, to effect setting device systems and methods for providing appropriate patch names to user-defined patches.

2. Related Art

Effect devices for providing effects, such as, distortions, reverbs, and the like, to musical notes generated by musical instruments, such as electric guitars, or the like have been widely used among musical instrument players.

Japanese Patent Application Laid-open No. 2000-231380 discloses an effect device, known as a multi-effector, for applying multiple effects to a musical note. In such a device, the multiple effects applied to the musical note may be each respectively set up with corresponding parameters as a patch. Multiple patches are stored in memory before using the effect device, and the effects may be applied to a musical performance by selecting any of the patches. Because there are a large number of patches stored in memory, a user is required to attach a unique patch name to each patch in order to identify a patch. Patch names can be descriptive. For example, a patch for providing an effect, such as a stack amp used with a distortion system, may have a patch name such as “DIST STACK” or the like.

Japanese Patent Application Laid-open No. H4-264680 discloses a method for affixing a name to a file, such as a document, by appropriately selecting from among a plurality of pre-registered keywords. In addition, Japanese Patent Application Laid-open No. H10-11343 discloses selecting a desired keyword from among pre-registered keywords and adding it as an automatically generated character string.

However, pre-registered keywords often include keywords that are inapplicable or inappropriate. Furthermore, some keywords may inadequately describe or otherwise inadequately indicate characteristics of the setting state. Thus, when selecting from a large number of keywords, a user is often presented with too many keywords that are of no use to the user, resulting in waste of considerable time and effort on the part of the user in selecting an applicable or appropriate patch name.

SUMMARY OF THE DISCLOSURE

An effect setting device for setting multiple types of effects may include, but is not limited to, an effect providing means, a patch setting means, a name display means, a name selection means, a patch name creation means, a patch memory means, a patch name selection means, and an effect setting means. The effect providing means may be for providing multiple types of effects to an inputted musical signal to output a musical signal to which the multiple types of effects have been provided by the effect providing means. The patch setting means may be for establishing a configuration of multiple types of effects providable by the effect providing means as a patch.

The name display means may be for displaying multiple candidate names providable to the patch established with the patch setting means. The multiple candidate names may be based on the patch established with the patch setting means. The name selection means may be for selecting a candidate name from the multiple candidate names displayed by the name display means. The patch name creation means may be for creating a patch name that includes the candidate name selected from the multiple candidate names with the name selection means.

The patch memory means may be for storing the patch name created with the patch name creation means and the patch established with the patch setting means. The patch name selection means may be for selecting a desired patch name from a plurality of patch names stored in the patch memory means. The effect setting means may be for setting a configuration of multiple types of effects providable by the effect providing means corresponding to the patch stored in the patch memory means based on the patch name selected with the patch name selection means.

Each effect setting of the multiple types of effects provided by the effect providing means may be set as a patch. In response to the patch being set with the patch setup means, multiple candidate names for naming the patch may be displayed by the name display means. Accordingly, multiple names corresponding to the patch may be displayed as patch name candidates.

In various embodiments, each of the multiple candidate names displayed by the display means may have a priority. The multiple candidate names may be displayed by the display means based on the priority of each of the multiple candidate names.

The multiple candidate names may be prioritized. The name display means may display the multiple candidate names in accordance with their respective priorities. As a result, preferred names having high priorities are displayed to the user before other names thus allowing the user to select the most suitable name quickly.

In various embodiments, the effect setting device may further include a keyword storage means that may be for storing keywords corresponding to each of the multiple types of effects providable by the effect providing means. The patch setting means may be further configured to determine whether a type of effect of the multiple types of effects is to be provided to the inputted musical signal. The name display means may display a candidate name, which may be stored in the keyword storage means, and may correspond to the type of effect of the multiple types of effects determined by the patch setting means to be provided to the inputted musical signal.

Any candidate name from among the multiple candidate names displayed by the name display means may be selected by the name selection means. A patch name including the candidate name selected by the name selection means may be created by the patch name creation means. Consequently, a user can be provided with a keyword for naming a patch that suitably reflects the effect setting of the multiple types of effects and suits the preferences of the user. Furthermore, because the candidate names correspond to the configuration of the established patch, names that are completely unrelated to the patches may not be considered as candidates. As a result, only candidate names that would be appropriate (i.e., related) to the patch may be displayed. Thus, the number of candidate names displayed to the user may be reduced allowing the user to select and find an appropriate patch name easily and quickly.

In various embodiments, the effect setting device may further include a parameter setting means that may be for setting a parameter for the patch established with the patch setting means. The name display means may display a candidate name based on the parameter set with the parameter setting means. The patch memory means may be configured to store the parameter set with the parameter setting means based on the patch established with the patch setting means. The effect setting means may set multiple types of effects based on the patch established with the patch setting means and the parameter set with the parameter setting means.

Parameters of the multiple types of effects may be set by the parameter setting means. The name display means may display candidate names based on the parameter set by the parameter setting means. Accordingly, in a case where the user sets an effect that is distinct or remarkable because a particular parameter (or more) was set, the display means may display a candidate name appropriate to the effect and the related particular parameter.

In various embodiments, the effect setting device may further include a decision means and a keyword storage means. The decision means may be for determining whether the parameter set with the parameter setting means is a prescribed parameter. The keyword storage means may be for storing keywords corresponding to each of the multiple types of effects providable by the effect providing means. The name display means may display a candidate name, which may be stored in the keyword storage means, and may correspond to a prescribed type of effect having the prescribed parameter in a case where the parameter set with the parameter setting means is determined to be the prescribed parameter by the decision means.

The decision means may be for determining whether the parameter set by the parameter setting means is a prescribed parameter. The keyword corresponding to the respective effects of multiple types provided by the effect providing means may be stored by the keyword storage means. Thus in a case where the parameter set by the parameter setting means is the same as the prescribed parameter, the name display means may refer to the keyword storage means and may display the name that corresponds to the type of effect to which the parameter belongs as a candidate name. Thus when, for example, the prescribed parameter is regarded as distinct, a name that corresponds to the type of effect to which that parameter belongs can be selected as the patch name.

In various embodiments, the effect setting device may further include a decision means that may be for determining whether the parameter set with the parameter setting means is a prescribed parameter. A candidate name may be a numerical value of the prescribed parameter displayed by the name display means and may correspond to the prescribed parameter in a case where the parameter set with the parameter setting means is the prescribed parameter. Accordingly, the parameter such as the numerical value, which corresponds to the prescribed parameter may become a name of the patch.

An effect setting device may include, but is not limited to, circuitry, a first control, a display device, a second control, and a storage device. The circuitry may be configured to provide one or more types of effects to an inputted music signal. The first control may be for setting a patch for the one or more types of effects to be provided by the circuitry to the inputted music signal. The patch may be associated with multiple candidate keywords. The display device may be configured to display at least one of the multiple candidate keywords. The second control may be for assigning a patch name to the patch. The patch name may include a candidate keyword from the multiple candidate keywords. The storage device may be for storing the patch and the patch name. The circuitry may be configured to provide the one or more types of effects to the inputted music signal based on the patch stored in the storage device.

In some embodiments, the second control may be further configured to select a desired patch name from a plurality of patch names stored in the storage device. The circuitry may be configured to provide one or more types of effects to the inputted music signal based on the patch corresponding to the desired patch name. In some embodiments, the storage device may comprise flash memory.

In various embodiments, the effect setting device may further include a storage element that may be for storing an effect type name corresponding to each of the one or more types of effects. In further embodiments, the effect type names may be stored in the storage element during manufacture of the effect setting device.

In various embodiments, the first control may be further configured to selectively toggle on and off at least one of the one or more types of effects. The display device may be configured to selectively display candidate keywords corresponding to types of effects that are toggled on by the first control.

In various embodiments, each of the multiple candidate keywords may be associated with the patch correspond to a respective one or more types of effects.

In various embodiments, the first control may be further configured to set a parameter for setting a configuration of the patch. In further embodiments, the multiple candidate keywords may be obtained based on the parameter. In some embodiments, the storage device may be further configured to store the parameter. In some embodiments, the circuitry may be configured to provide the one or more types of effects to the inputted music signal based on the patch stored in the storage device and the parameter. In some embodiments, a candidate keyword may be only associated with the patch when the parameter meets or exceeds a prescribed parameter. In some embodiments, a candidate keyword may correspond to the parameter.

In various embodiments, each of the multiple candidate keywords may have a respective priority. The multiple candidate keywords may be displayed based on the respective priority of each of the multiple candidate keywords. In various embodiments, the circuitry may be further configured to provide the inputted music signal with the one or more types of effects as an output signal. In various embodiments, the second control may be further configured to select the candidate keyword from the multiple candidate keywords.

A method for an effect setting device may include, but is not limited to any one of or combination of, (i) establishing a patch including one more types of effects; (ii) associating the patch with multiple candidate keywords; (iii) displaying at least one of the multiple candidate keywords; (iv) assigning a patch name to the patch, the patch name including a candidate keyword selected from the multiple candidate keywords; (v) storing the patch and the patch name; and (vi) providing the one or more types of effects to an inputted music signal based on the patch stored in the storage device.

BRIEF DESCRIPTION OF THE DRAWINGS

FIG. 3 illustrates a table showing parameters and keywords corresponding to various effect types of an effect device according to an embodiment of the present invention;

FIGS. 4(*a*) and 4(*b*) illustrate examples of keyword list tables stored in RAM according to an embodiment of the present invention;

DETAILED DESCRIPTION OF EMBODIMENTS OF THE PRESENT INVENTION

Figure 1:
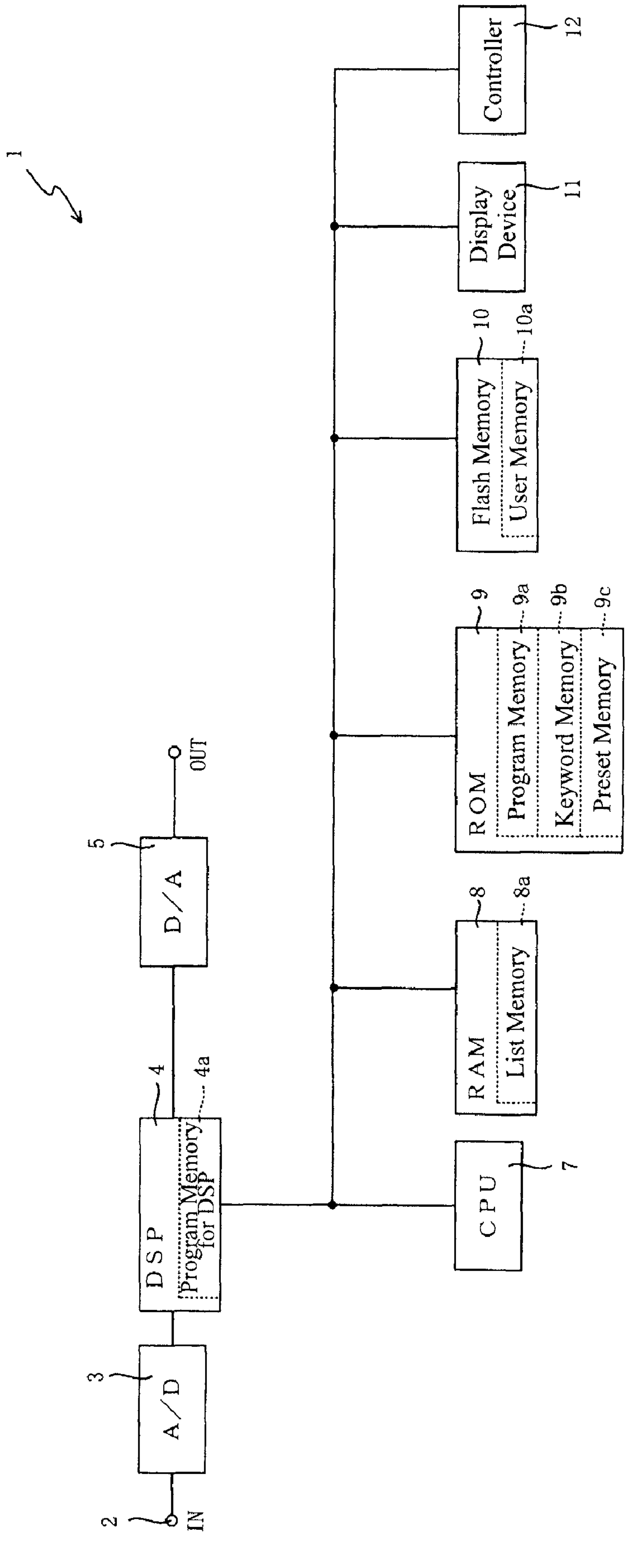
FIG. 1 is a block diagram illustrating an electrical configuration of an effect device according to an embodiment of the present invention.

FIG. 1 is a block diagram illustrating an electrical configuration of an effect setting device 1 according to an embodiment of the present invention. The effect setting device 1 may be a multi-effector configured to provide multiple types of effects to an inputted musical note, and may be further configured to provide an appropriate patch name to a user-defined patch.

The effect setting device 1 may include, but is not limited to, an input terminal 2, an A/D (analog-digital) converter 3, a DSP (digital signal processor) 4, a D/A (digital-analog) converter 5, an output terminal 6, a CPU 7, RAM 8, ROM 9, flash memory 10, a display device 11, and a controller 12. The effect setting device 1 may further include a system bus for connecting, for example, the DSP 4, the CPU 7, the RAM 8, the ROM 9, the flash memory 10, the display device 11, and the controller 12.

The input terminal 2 may be for receiving an output signal of a musical instrument, such as an electric guitar, bass, or the like. The musical instrument may transmit an analog electrical signal, for example, from a pick-up of an electric guitar to the input terminal 2. The analog electrical signal inputted to the input terminal 2 may be input to the A/D converter 3.

The A/D converter 3 may be configured to convert the analog electrical signal into a digital signal. The A/D converter 3 may be configured to sample the analog signal at a specified sampling frequency (e.g., 48 kHz), and may be further configured to quantize the sampled signal at a specified bit count (e.g., 16 bits), and may be yet further configured to output the digital signal to the DSP 4.

The DSP 4 is a digital signal processor and may be configured to perform processing for providing an effect to the digital signal output from the A/D converter 3. The DSP 4 may include program memory 4*a* for the DSP 4 configured to store a control program and a program for providing multiple types of effects. The DSP 4 may provide multiple types of effects to the inputted digital signal by executing the control program stored in the program memory 4*a*. Parameter values used during execution of the control program may be input from the CPU 7. A sequence that provides multiple types of effects may be instructed by the CPU 7 (and/or the DSP 4). A sequence that carries out processing based on the instructions of the CPU 7 may be set.

The digital signal provided with an effect by the DSP 4 may be converted to an analog signal by the D/A converter 5, and may be outputted from the output terminal 6. In some embodiments, the effect setting device 1 may further include a filter (not shown) configured to form a waveform, or the like, where the waveform and the analog signal from the D/A converter 5 may be outputted from the output terminal 6. An amplifier (not shown), or the like, may be connected to the output terminal 6, which may allow sound to be emitted from a speaker (not shown), or the like, driven by the amplifier (not shown).

The CPU 7 may be configured to execute a control program stored in the ROM 9. The RAM 8 may for temporarily storing variables when the CPU 7 executes control programs stored in the ROM 9. The RAM 8 may include list memory 8*a*, which may be for storing appropriate keywords for user-defined patches. These keywords may be prioritized, and may be displayed by the display device 11 based on their respective priority, where the keywords can be selected by the user and used as a patch name.

The ROM 9 may include program memory 9*a*, keyword memory 9*b*, and preset memory 9*c*. The program memory 9*a* may be configured to store a control program. The keyword memory 9*b* may be configured to store a plurality of keywords corresponding to an effect type usable as for at least a portion of a patch name. The preset memory 9*c* may be configured to store a preset patch, which may be a patch provided by the manufacturer, for example. The preset memory 9*c* may include a plurality of stored patches sorted by group numbers and numbers within the corresponding group numbers. In other embodiments, a preset memory configured to store preset patches may be provided in any other suitable storage device, such as a removable memory card, a compact disc, flash drive, or the like.

The flash memory 10 may be nonvolatile, rewritable memory configured to retain memory even if power is no longer supplied to the flash memory 10. The flash memory 10 may include user memory 10*a*. The user memory 10*a* may be configured to store a user-defined patch. The user memory 10*a* may be further configured to store patch names assigned to the user-defined patch. The user memory 10*a* may be like the preset memory 9*c* in that the user memory 10*a* may include a plurality of stored patches sorted by group numbers and numbers within the corresponding group numbers.

The display device 11 may be configured to display patch-related information, and may include various characters and icons. For example, the display device 11 may be configured to display preset patch names, user-defined patch names, patch name candidates for naming a user-defined patch, an effect type corresponding to a selected patch, parameter values related to the effect type, or the like. The display device 11 may be an LCD (liquid crystal display), LED, or the like. Screens displayed by the display device 11 are described later with reference to FIG. 5.

Figure 2:
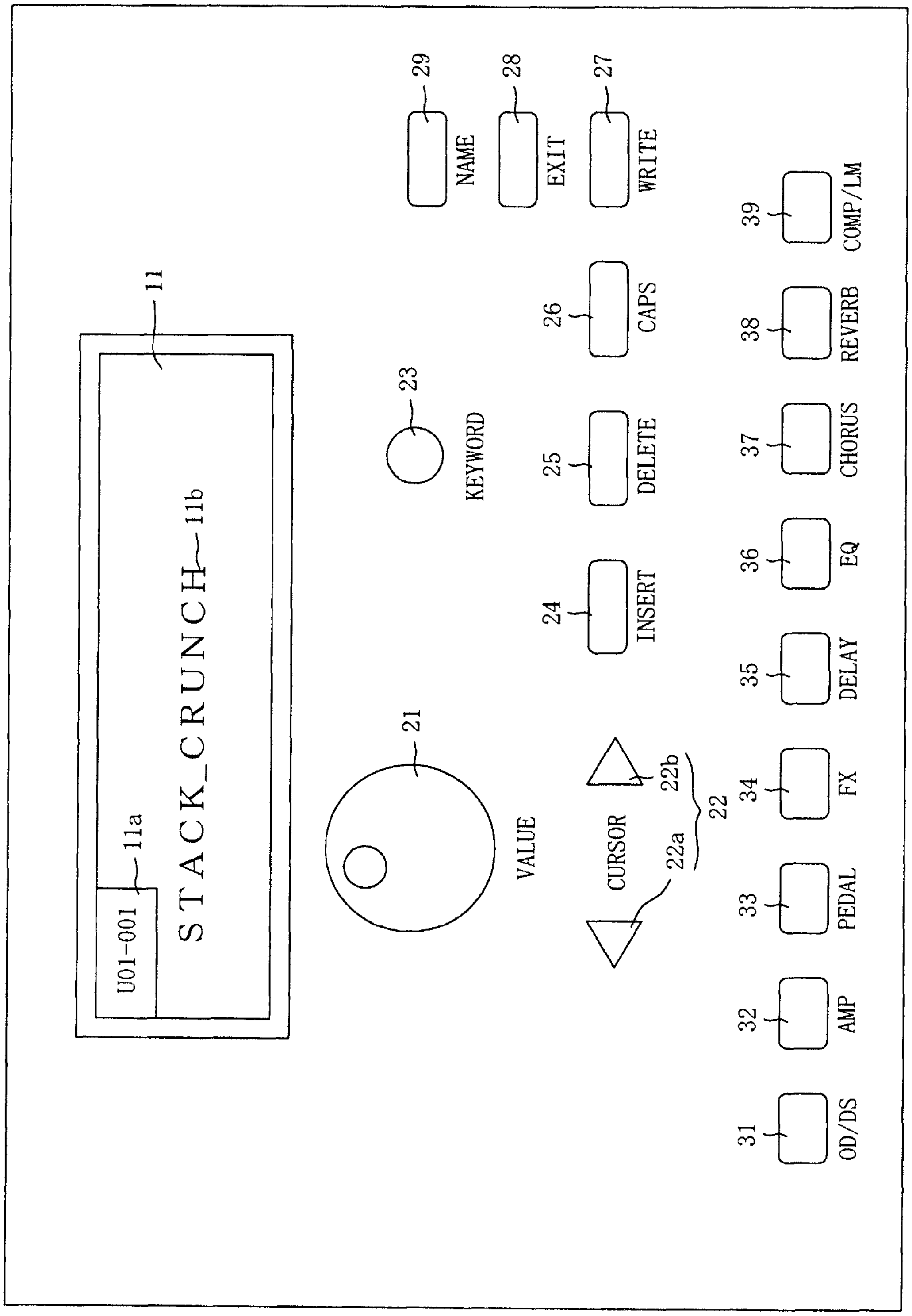
FIG. 2 illustrates a control panel according to an embodiment of the present invention.
Figure 5A:
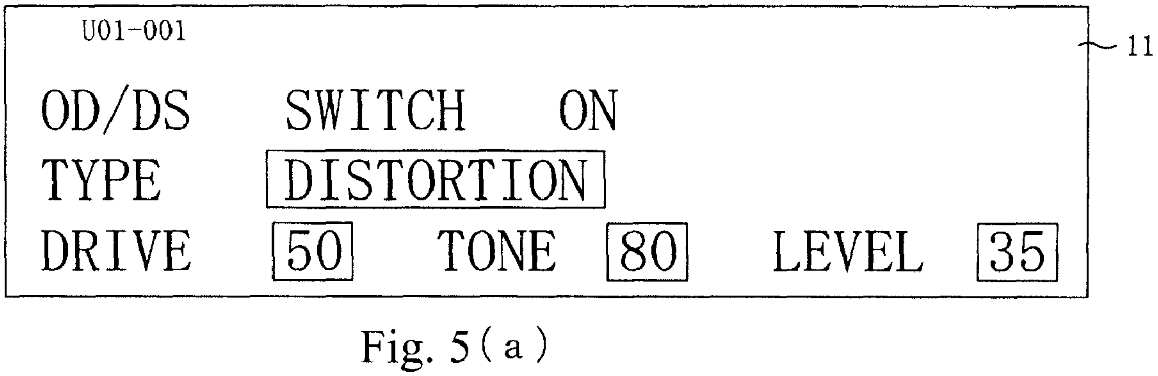
FIGS. 5(*a*)-5(*d*) illustrate examples of screens displayed in a display device according to an embodiment of the present invention.
Figure 5B:
Figure 5C:
Figure 5D:

With reference to FIGS. 1 and 2, the controller 12 may include various types of controls provided on a control panel to be operated by the user. The control panel may include, but is not limited to, the display device 11, a dial 21, and a plurality of switches 22-39. The control panel may allow the user to select one of multiple modes for the effect setting device 1. For example, the user can select from a Play mode, a Patch Setup mode, and a Patch Name Input mode.

The Play mode may be for performing a selected patch from the preset patches stored in the ROM 9 or the user-defined patches stored in the flash memory 10. Accordingly, the effect(s) corresponding to the selected patch are provided to a musical note (e.g., a musical note inputted from an electrical guitar, or the like). In the Play mode, when the dial 21 is operated to one end (e.g., rotated clockwise), the user may be able to scroll or otherwise review in order preset patches and/or user-defined patches that may be sorted by group number, and may be further sorted by numbers within the group. Once the preset patches are displayed, the user-defined patches may be then similarly displayed and selected. When the dial 21 is operated to the other end (e.g., rotated counter-clockwise), the user may be able to scroll or otherwise review in reverse order the preset patches and/or the user-defined patches.

The Patch Setup mode may be for setting a user-defined patch. When the current mode is the Play mode, the Patch Setup mode can be selected by operating the write button 27, for example. The Patch Setup mode may allow the user to establish multiple types of effects and related parameters to set up a user-defined patch. It should be noted that a user-defined patch may include a new patch set up a new or an altered factory-preset patch (e.g., stored in the ROM 9 during manufacture of the effect setting device 1) that has a value or name changed by the user.

The Patch Name Input mode may be for inputting and assigning a patch name to a user defined patch set up in the Patch Setup mode, or for revising a name of a preset patch. The Patch Name Input mode may be selected by operating the name button 29, for example. The Patch Name Input mode may allow the user to assign a patch name to a user-defined patch set up in the Patch Setup mode or a preset patch, and can be stored in the user memory 10*a*.

The dial 21 may be a controller configured to operate a rotary encoder, or the like. In other embodiments, the dial 21 may be any type of controller such as a knob, slider, or the like. The dial 21 may be for selecting a patch while in the Play mode. In the Patch Setup mode according to some embodiments, the dial 21 may be configured to change a numerical value displayed by the display device 11, to set up various parameters and values for one or more types of effects in a user-defined patch. For example, rotating the dial 21 to one end may increase the numerical value displayed by the display device 11, and rotating the dial to the other end may decrease the numerical value displayed by the display device 11. While in the Patch Name Input mode, for example, the user can operate the dial 21, alone or in addition to other various buttons, to establish various keywords and characters to assign a patch name to a patch, as will be described later.

A cursor button 22 may be configured to control movement of a cursor, for example, while the effect setting device 1 is in the Patch Name Input mode. The cursor button 22 may include a left cursor button 22*a* and a right cursor button 22*b*. The left cursor button 22*a* may control movement of the cursor in a left direction and the right cursor button 22*b* may control movement of the cursor in a right direction.

The control panel may include controls for editing a patch name such as, but not limited to, a keyword button 23, an insert button 24, a delete button 25, and a caps button 26, any or all of which may be used during the Patch Name Input mode. The keyword button 23 may be for controlling the display of a keyword stored in the list memory 8*a* provided in the RAM 8.

For example, in a case where the effect setting device 1 is in the Patch Name Input mode, and the dial 21 is operated while pressing the keyword button 23, the keywords stored in the list memory 8*a* may be displayed sequentially at the cursor position (e.g., displayed one at a time). In other embodiments, more than one of the keywords stored in the list memory 8*a* may be displayed.

A currently displayed keyword may be a possible patch name candidate (i.e., a not yet selected patch name) for a user-defined patch, and may be indicated as such. For example, the currently displayed keyword (i.e., a patch name candidate) may appear as a negative image (i.e., clear text on a dark background) with flashing text. However, the currently displayed keyword may be indicated as a candidate in any suitable manner, such as, but not limited to differing font type, size, or color, or any other suitable manner to distinguish a not yet selected patch name and "normal" text, such as that the remaining text.

Accordingly, the user may select the currently displayed keyword to be added (or to replace) the currently displayed patch name (e.g., the remaining text) to set a patch name by operating (e.g., pressing down) an insert button 24. Accordingly, the currently displayed keyword, which may be flashing, for example, may be replaced with normal characters to match the remaining text.

In some embodiments, when the keyword button 23 is operated, a keyword with the highest priority among the multiple keywords stored in the list memory 8*a* may be displayed. By operating the dial 21 in one direction, the other keywords stored in the list memory may be displayed sequentially from highest priority to lowest priority. When the dial 21 is operated in an opposite direction, the other keywords may be displayed sequentially from lowest priority to highest priority. In other embodiments, more than one of the keywords may be displayed. In some embodiments, the priorities for each of the keywords may be pre-defined in the keyword memory 9*b* of the ROM 9 during manufacture of the effect setting device 1, for example.

In some embodiments, the effect setting device 1 may be configured to allow a user to input characters to set up a patch name, in addition to or in place of the keywords provided from the keyword list in the list memory 8*a*. For example, in a case where the dial 21 is operated to one end without pressing the keyword button 23, the lower case alphabet from a to z and the numerals from 0 to 9 may be displayed in order. Whereas in a case where the dial 21 is operated to another end without pressing the keyword button 23, the numerals from 9 to 0 and the alphabet from z to a are displayed in reverse order from that described above.

A currently displayed character may be a patch name candidate and may be indicated as such, for example, as described above with respect to candidate keywords, in order to demonstrate that the displayed character has not yet been selected to be a portion of the patch name for the user-defined patch. Accordingly, the currently displayed character may be selected by operating the insert button 24 and, in turn, be inserted or be replaced with normal text, as discussed above. In other embodiments, the effect setting device 1 may include a keyboard (e.g., QWERTY, a "cellphone" keyword, or the like), or any other suitable manner for inputting text, such as a mouse for selecting characters on the display screen.

The insert button 24 may be further configured to insert a one-character space at the cursor position when a currently displayed keyword or character is selected by operating the insert button 24, and to shift the character string of the remaining text, for example, one character position to the right. In other embodiments, a button different from the insert button may be provided to insert the one-character space.

The delete button 25 may be configured to delete the character currently designated by the cursor. For example, when the delete button 25 is operated, the character currently designated by the cursor may be deleted and the character string that included the now deleted character may be shifted one character position to the left. In some embodiments, the delete button 25 may be configured to delete more than one character, for example, the delete button 25 may delete the entire keyword or patch name.

The caps button 26 may be configured to change a case of the character currently designated by the cursor, for example, from a lower case letter to an upper case letter. Similarly, if the character currently designated by the cursor is an upper case letter, the case of the character may be changed to a lower case letter.

The write button 27 may be configured to switch the effect setting device 1 from the Play mode to the Patch Setup mode by operating the write button 27 during the Play Mode. The write button 27 may be further configured to write the user-defined patch and the patch name to memory, for example, by operating the write button 27 during the Patch Setup mode.

The exit button 28 may be configured to return the effect setting device 1 to the Play mode from the Patch Setup mode or the Patch Name Input mode. The name button 29 may be configured to switch the effect setting device 1 to the Patch Name Input mode, for example, from the Patch Setup mode.

The effect setup buttons 31-39 may be configured to select a type of effect to be set. For example, during the Patch Setup mode, one of the effect setup buttons 31-39 can be selected to set parameters of the type of effect corresponding to the selected button to set up a patch for applying multiple types of effects to a sound. In some embodiments, a patch for applying multiple types of effects to a sound may be set by sequentially operating one or more of the effect buttons 31-39 for setting each of the effects to be set. In some embodiments, the control panel may include a foot pedal (not shown) and/or a switch (not shown) for switching patches and/or turning effects on and off.

FIG. 3 illustrates a table showing parameters and keywords corresponding to various effect types of the effect setting device 1 (FIG. 1) according to an embodiment of the present invention. This table may help to explain the various types of effects and corresponding effect types, parameters, and keywords. The settings of the multiple types of effects may be set based on various parameters, such as, but not limited to, whether or not a corresponding effect switch is OFF or ON, an effect type selected, a delay time, a level, a rate, or the like, for each type of effect that makes up a patch.

With reference to FIGS. 1-3, the effect setting device 1 may be configured to provide multiple types of effects, such as, but not limited to, an overdrive/distortion effect 51, an amp simulator effect 52, a pedal effect 53, an FX effect 54, a delay effect 55, a chorus effect 56, a reverb effect 57, an equalizer effect 58, and a compressor/limiter effect 59. The multiple types of effects may correspond to the effect setup buttons 31-39.

The overdrive/distortion effect 51 (hereinafter "OD/DS effect 51") is an effect that may provide distortion to a musical note. The OD/DS effect 51 may be toggled on and off with effect switch 51*a*. When used, the effect switch 51*a* is set to ON, and when not used, the effect switch 51*a* is set to OFF. Moreover, it should be noted that this ON/OFF setting may be similar to the other effect switches, unless otherwise noted.

When the effect switch 51*a* is set to ON, any of overdrive, distortion, or fuzz may be additionally selected as the effect type 51*b*. The overdrive effect type may be a soft distortion, similar to a distortion caused by a vacuum tube. The distortion effect type may be a slightly hard distortion. The fuzz effect type may be an effect that provides a harder distortion than the overdrive and distortion effect types.

Respective keywords may be set for each of the effect types 51*b*, such as (but not limited to) "OVD" for the overdrive effect type, "DIST" for the distortion effect type, and "FUZZ" for the fuzz effect type. Other keywords for each of the effect types 51*b* (and the other effect types to be discussed later) may be provided in place of or in addition to these keywords. Each keyword, which may correspond to a respective effect type 51*b*, may be stored in the keyword memory 9*b* of the ROM 9, for example, for later naming a user-defined patch.

When the effect switch 51*a* is set to ON, a keyword corresponding to the OD/DS effect 51 (i.e., the patch selected) may be stored in the list memory 8*a* of the RAM 8. When the effect switch 51*a* is set to OFF, "NULL" may be stored in the list memory 8*a* as the keyword corresponding to the OD/DS effect 51. Furthermore, parameters, such as drive 51*c*, tone 51*d*, and level 51*e*, may be set to numerical values ranging, for example, from 0 to 100. The parameters may be stored in the user memory 10*a* as a user-defined patch in addition to or in place of the effect switch status (e.g., OFF or ON) and the effect type 51*b*.

The amp simulator effect 52 may be an effect that imitates guitar amp characteristics. The amp simulator effect 52 may be toggled on and off with effect switch 52*a*. When the effect switch 52*a* is set to ON, any of clean, crunch, lead, and custom may be selected as the effect type 52*b*. The clean effect type may have a flat frequency characteristic from a low region up to a high region with no distortion. The crunch effect type may cause slight distortion and may provide a performance characteristic of a guitar in a chord performance. The lead effect type may be an effect for lead guitar use, and may have a frequency characteristic with a slightly elevated midrange. Furthermore, parameters, such as, gain 52*c*, bass 52*d* (low range level), middle 52*e* (midrange level), and treble 52*f* (high range level) may be set to numerical values ranging, for example, from to 100. The parameters may be stored in the user memory 10*a* as a portion of the parameters of a user-defined patch.

With respect to the custom effect type, any of combo, stack, and small may be selected as an effect type 52*g*. The combo effect type may be for a medium-sized amp having one or two speakers of 10-12". The stack effect type may be for a large-sized guitar amp having piled up cabinets in two levels using four speakers of 8-12". The small effect type may be for a small-sized amp having one 8" speaker. When any of these effect types 52*g* are selected, parameter 1 (52*h*) and parameter 2 (52*i*) may each be set to a numerical value ranging, for example, from 0 to 100. Parameter 1 (52*h*) and parameter 2 (52*i*) may provide distinctive characteristics for the effect type 52*g*, for example, gain, bass, middle, or the like.

When the amp simulator effect 52 has been selected as the user-defined patch, the keyword corresponding to the type selected as a patch may be stored in the list memory 8*a*. Keywords, such as "CLEAN" for the clean effect type; "CRUNCH" for the crunch effect type, "LEAD" for the lead effect type, "COMBO" for the combo effect type, "STACK" for the stack effect type, and "SMALL" for the small effect type may be stored in the keyword memory 9*b* and may correspond to the respective effect type. The keyword corresponding to the type selected as a user-defined patch may be stored in the list memory 8*a* of the RAM 8 as the keyword corresponding to the amp simulator effect 52. When the effect switch 52*a* is set to OFF, "NULL" may be stored in the list memory 8*a* as a keyword corresponding to the amp simulator 52. Furthermore, the set parameters may be stored in the user memory 10*a* in addition to or in place of the effect switch status (e.g., OFF or ON) and the effect type 52*b*.

The pedal effect 53 may be for selecting either volume or wah as the effect type 53*a*. The effect setting device 1 may include a foot pedal (not shown) that swings about an axis or changes an angle between the foot pedal (not shown) and its based when the foot pedal (not shown) is operated by the user.

The effect setting device 1 and/or the foot pedal (not shown) may be configured to change various types of characteristics based on an operation of the foot pedal (not shown), for example, based on how deep the foot pedal (not shown) is pressed in an acute-angled position.

The volume effect type may control sound volume output from the effect setting device 1. The wah effect type may be for changing a frequency range amplified by the effect setting device 1. For example, the high range may be emphasized when the foot pedal (not shown) is deeply pressed (e.g., operated in an acute-angled position), and the low range may be emphasized when the pedal is not deeply pressed (e.g., operated in an obtuse-angled position).

"WAH" may be the keyword for the wah effect type and be stored in the keyword memory 9*b* and may correspond to the effect type. In some embodiments, the volume effect type does not have a keyword because the volume effect type does not have any particular characteristics like the other effect types may have. Accordingly, when the type is selected as a patch, the corresponding keyword may be stored in the list memory 8*a* of the RAM 8, and "NULL" may be stored in the list memory 8*a* when the volume effect type is selected.

Parameter values 53*b*, 53*c* may be set based on a position of the foot pedal (not shown) and may be stored in the user memory 10*a*. For example, the parameter values may range from a minimum value 53*b* ranging from 0 to 100, which may be set at a position where the pedal is not deeply pressed, to a maximum value 53*c* ranging from 0 to 100, which may be set at a position where the pedal is deeply pressed in full. The parameters may be stored in the user memory 10*a* as a portion of the parameters of a user-defined patch in addition to or in place of the effect type 53*a*.

The FX effect 54 may be an effect for providing modulation through a low frequency oscillator (LFO). The FX 54 may be toggled on and off with effect switch 54*a*. When the effect switch 54*a* is set to ON, any of phaser, flanger, and tremolo can be set as the effect type 54*b*.

The phaser effect type may provide a sound in which the original sound and a sound with a phase change (phase shift) are mixed by an arbitrary percentage, and may cause the tone color to be continuously changed using the principle of "wave interference." The flanger effect type may be a type of delay and may obtain a continuous change of the tone color using wave interference somewhat similar to the phaser effect type. The flanger effect type may be different in that the original sound does not mix in a delay sound that has modulated the delay time. The tremolo effect type may be an effect that periodically raises and lowers the sound volume.

As for the keywords, "PHAS" may be set for the phaser effect type, "FLAN" may be set for the flanger effect type, and "TREMO" may be set for the tremolo effect type. These keywords may be stored in the keyword memory 9*b*, as discussed above. The keyword corresponding to the type selected as a patch may be stored in the list memory 8*a*. When any of these types are selected, parameter 1 (54*c*) and parameter 2 (54*d*) may each be set to a numerical value ranging, for example, from 0 to 100. These parameters may be for setting, for example, a low frequency cycle, or the like. The parameters may be stored in the user memory 10*a* as a portion of the parameters of a user-defined patch in addition to or in place of the effect switch status (e.g., OFF or ON) and the effect type 54*b*.

The delay effect 55 may be an effect that causes a musical note to be delayed a specified time. The delay effect 55 may be toggled on and off with the effect switch 55*a*. When the effect switch 55*a* is set to ON, a delay time 55*b*, which corresponds to a specified time for delaying the musical note, may be set to a numerical value ranging, for example, between 0 and 2000 ms. The keyword may be "DELAY" and may be stored in the keyword memory 9*b*. The level 55*c* may be another parameter of delay 55 that may be set to a numerical value ranging, for example, from 0 to 100. These parameters may be stored in the user memory 10*a* as a portion of the parameters of a user-defined patch.

In some embodiments, the above-mentioned types of effects (e.g., the OD/DS effect 51, the amp simulator effect 52, the pedal effect 53, and the FX effect 54) may be classified in the effects of a musical instrument system. In some embodiments, the effect setting device 1 may be setting an effect of a musical instrument system when at least one of these four keywords is not "NULL," whereas the effect setting device 1 may be setting an effect for a space system if these four keywords are all "NULL."

Furthermore, in a case where the effect setting device 1 is setting an effect of a musical instrument system and the delay time 55*b* is set to, for example, 1000 ms or more, a corresponding keyword may be stored in the list memory 8*a* of the RAM 8. Thus in some embodiments, a delay of 1000 ms may be deemed as creating a noteworthy effect and worth storing as a patch name. Consequently, in some embodiments, when a short delay time (e.g., 500 ms) has been set during setup of an effect of a musical instrument system, the short delay time may be deemed as not being a remarkable effect. Accordingly, even if the short delay time is given to a patch setting, no keyword corresponding to the short delay time effect setting may be stored in the list memory 8*a* of the RAM 8. In such embodiments, omitting a keyword corresponding to a relatively insignificant effect may provide an easier and thus less time consuming manner for the user to search for an appropriate patch name.

As discussed, in some embodiments, in a case where the four keywords are all "NULL" (e.g., the effect switches of the OD/DS effect 51, the amp simulator effect 52 and the FX effect 54 are set to OFF, and the volume has been selected as the effect type of the pedal effect 53) an effect for a space system may be set up. In such embodiments, the delay effect 55, a chorus effect 56, and a reverb effect 57, may be set, and any corresponding keywords may be written to the keyword list. This process may be known as the keyword creation process of the space system effect and is discussed in more detail with respect to FIG. 8.

Returning to FIGS. 1-3, an effect sound of a musical instrument system may be an effect sound added to an inputted musical note where the effect sound of the musical instrument system may have a quality recognized by the user as the tone color of a completely separate musical instrument compared to the musical note before the effect was added. For example, when distortion is applied to a normal electric guitar sound, the electric guitar sound having had the distortion applied may be recognized by the user as a different tone color to the extent that it can even be thought to be a completely different musical instrument. Similarly, the same may be true for the amp simulator effect 52, the pedal effect 53 (e.g., the wah effect type), the FX effect 54, and the delay effect 55 (e.g., 1000 ms or more).

An effect sound of a space system may be an effect sound added to an inputted musical note, but strengthens and leaves behind an impression of the musical note before the effect was added, and, even after the effect sound is added, has a quality recognized by the user as the tone color of the same musical instrument compared to the musical note before the effect was added. For example, even if the reverb and chorus of a space system are added to a normal electric guitar sound, the musical note of the normal electric guitar may not change and may be recognized by the user as having the same tone color but with an effect added to the musical note where the effect, such as a reverberation and/or a thickness of the sound has been increased before being added.

In some embodiments, during the keyword creation process of the space system effect, when the effect switch 55*a* is set to ON, a preset keyword "DELAY" and the value of the delay time 55*b* may always be regarded as a keyword, and the value of the level 55*c* may be also regarded as an other keyword.

The chorus effect 56 may be an effect for raising and lowering a pitch by periodically changing the delay time of the inputted musical note, and may be further combined with the original note to increases a thickness of the sound as playing in concert. The chorus effect 56 may be toggled on and off with effect switch 56*a*. When the effect switch 56*a* is to ON, a rate 56*b* for setting a speed of a cycle and may be set to a numerical value ranging, for example, from 0 to 100. The parameters may be stored in the user memory 10*a* as a portion of the parameters of a user-defined patch.

The keyword of the chorus effect 56 may be "CHOR" and may be stored in the keyword memory 9*b*. When the effect switch 56*a* is set to ON, the keyword and the value of the rate 56*b* may be written into the keyword list in the list memory 8*a* as a keyword. For example, in a case where the rate 56*b* is set to 20, the keyword may be "CHOR 20" or "CHOR R20," where "R" may indicate that the value "20" corresponds to the rate 56*b*.

The reverb effect 57 may be an effect for adding reverberation to an original note. The reverb effect 57 may imitate a reverberation, or the like, of a hall, for example, by infinitely mixing a note that has delayed an original note. The reverb effect 57 may be toggled on and off with effect switch 57*a*. When the effect switch 57*a* is set to ON, any of room, hall, and plate may be selected as the effect type 57*b*. A parameter, time 57*c*, may be a reverberation time that may be set ranging, for example, from a value of 0.1 to 10.0 seconds. The parameter may be stored in the user memory 10*a* as a portion of the parameters of a user-defined patch in addition to or in place of the effect switch status (e.g., OFF or ON) and the effect type 57*b*.

The room effect type may imitate a reverberation of a typical small room. The hall effect type may imitate a reverberation in a large space like a concert hall. The plate effect type may imitate the vibrations obtained from an end of a steel plate opposite from an end of the steel plate where vibrations are applied (e.g., the end of the plate struck by an object)

The keyword of reverb effect 57 may be "REV," the keyword of room may be "ROOM," the keyword of hall may be "HALL," and the keyword of plate may be "PLATE." The keywords may be stored in the keyword memory 9*b*. When the effect switch 57*a* is set to ON, the keyword corresponding to the effect type 57*b* selected as "REV" and a set reverberation time may be written to the keyword list as keywords in the list memory 8*a*. For example, in a case where the reverberation time is set to 1.2, the corresponding keyword may be "REV 1.2" or "REV T1.2," where "T" may indicate that the value "1.1" corresponds to the reverberation time 57*c*.

The equalizer effect 58 may be an effect for changing frequency characteristics. The equalizer 58 may be toggled on and off with the effect switch 58*a*. When the effect switch 58*a* is set to ON, parameters, such as the low (low range) level 58*b*, the middle (midrange) level 58*c*, and the high (high range) level 58*d* may be each set, for example, between −20 dB and +20 dB. The parameters may be stored in the user memory 10*a* as a portion of the parameters of a user-defined patch in addition to or in place of the effect switch status (e.g., OFF or ON).

The compressor/limiter effect 59 may be an effect for controlling volume. The compressor may be actively used in the processing of the sound itself. For example, the compressor may allow for a crisp sound by constricting the volume immediately after sound generation, or for a sustained sound by crushing the high parts of the level at the time of sound generation and raising the entire level. The limiter may be an effect for constricting a volume that exceeds a preset threshold to prevent an excessive signal level.

Parameters 59*c*-59*f* may be similar to the types of the effects mentioned above. The parameters may be stored in the user memory 10*a* as a portion of the parameters of a user-defined patch in addition to or in place of the effect switch status (e.g., OFF or ON) and the effect type 59*b*. Furthermore, in some embodiments, because the equalizer effect 58 and the compressor/limiter effect 59 do not have marked characteristics as effects, they may not be suitable as patch names, and thus keywords may not be attached.

The table shown in FIG. 3 prioritizes the order of the effects with the highest priorities at the top and the lowest priorities on the bottom of the table. The priority may be based on relative importance of the type of effect to the music instrument being used with the effect setting device. For example, in some embodiments, the highest priorities are assigned to the types of effects most commonly used and/or to those that provide the most remarkable sounds for an electric guitar. In some embodiments, the priority order may be assigned during manufacture of the device. In FIG. 3, the highest priority is the OD/DS effect 51, and the next highest priorities belong to the amp simulator effect 52, the pedal effect 53, and the FX effect 54, respectively. When affixing a name to a user patch, the keywords may be displayed according to this priority order.

FIGS. 4(*a*) and 4(*b*) illustrate examples of keyword list tables stored in the list memory 8*a* (FIG. 1) of the RAM 8 (FIG. 1) according to an embodiment of the present invention. The keyword list may be created, for example, when a user-defined patch is created or upon the effect setting device 1 further entering the Patch Name Input mode. FIG. 4(*a*) shows effects of a musical instrument system, and FIG. 4(*b*) shows effects of a space system.

With reference to FIGS. 1-3 and 4(*a*), the first keyword in the list is the keyword corresponding to the effect with the highest priority—and in this case, the OD/DS effect 51. When the effect switch 51*a* is set to OFF, "NULL" may be written in as the first keyword on the list (e.g., corresponding to the OD/DS effect 51). When the effect switch 51*a* is set to ON, the first keyword in the list may be the keyword corresponding to the effect type 51*b* selected. In the example shown in FIG. 4(*a*), the effect switch 51*a* is set to ON and the distortion effect type is selected as the effect type 51*b*. Accordingly, the keyword "DIST" may be the first keyword in the list.

The second keyword in the list is the keyword corresponding to the effect with the second highest priority—in this case, the amp simulator effect 52. When the effect switch 52*a* is set to OFF, "NULL" may be written in as the second keyword in the list (e.g., corresponding to the amp simulator effect 52). When the effect switch 52*a* is set to ON, the second keyword in the list may be the keyword corresponding to the effect type 52*b* selected. In the example shown in FIG. 4(*a*), the effect switch 52*a* is set to ON and the clean effect type is selected as the effect type 52*b*. Accordingly, the keyword "CLEAN" may be the second keyword in the list.

The third keyword in the list is the keyword corresponding to the effect with the third highest priority—in this case, the pedal effect 53. In the example in FIG. 4(*a*), volume is selected as the effect type, and "NULL" may be written in as the third keyword in the list. It is apparent that volume is the effect type in this example, because the effect with the third highest priority (in this example) is not provided with an effect switch for toggling on and off the effect type, wherein an "off" causes a "NULL" to be written in the keyword. As another example, in a case where the wah effect 53 is selected as the effect type, "WAH" may be written in as the third keyword in the list.

The fourth keyword in the list is the keyword corresponding to the effect with the fourth highest priority—in this case, the FX effect 54. When the effect switch 54*a* is set to OFF, "NULL" may be written in as the fourth keyword in the list (e.g., corresponding to the FX effect 54). When the effect switch 54*a* is set to ON, the fourth keyword in the list may be the keyword corresponding to the effect type 54*b* selected. In the example shown in FIG. 4(*a*), the effect switch 54*a* is set to ON and the phaser effect type is selected as the effect type 54*b*. Accordingly, the keyword "PHAS" may be written in as the fourth keyword in the list.

The fifth keyword in the list is the keyword corresponding to the effect with the fifth highest priority—in this case, the delay effect 55. When the effect switch 55*a* is set to OFF, "NULL" may be written in as the fifth keyword in the list (e.g., corresponding to the delay effect 55). When the effect switch 55*a* is set to ON and the delay time 55*b* equals or exceeds 1000 ms, the fifth keyword in the list may be the keyword "DELAY," which may be further appended with the keyword corresponding to the delay time 55*b*. In the example shown in FIG. 4(*a*), the effect switch 55*a* is set to ON and the delay time 55*b* is 1800 ms. Accordingly, the keyword "DELAY1800" may be written in as the fifth keyword on the list.

In some embodiments, as discussed, once the keyword list has been filled with the requisite keywords, setup of an effect of a musical instrument system may be deemed to have been completed. Similarly, set up of the effect may be deemed completed if the keywords in the keyword list for the effects having a priority higher than the delay effect have been filled. In the example shown in FIG. 4(*a*), setup of an effect of a musical instrument is complete because the list has been filled with five keywords as discussed above.

FIG. 4(*b*) shows an example of a keyword list created when an effect of a space system is set. As discussed above, in some embodiments, a keyword list for a space system effect occurs when a first number of keywords (e.g., first four) in the keyword list are set to "NULL." Also, as discussed, in some embodiments, if the effect switch 55*a* for the delay effect 55 is set to ON, the keyword may be "DELAY," which may be further appended to a delay time 55*b*, notwithstanding the length of the delay time. In the example shown in FIG. 4(*b*), the delay time 55*b* is set to 200 ms. Accordingly, the keyword "DELAY 200" may be written in as the fifth keyword on the list.

In the example shown in FIG. 4(*b*), the next keyword (e.g., the sixth keyword) on the list is "DELAY L55." In this example, the value of the level 55*c*, which may be a parameter of delay 55, is set to "55." The "L" preceding the value (e.g., "55") may indicate that the value "55" corresponds to the level 55*c*. When the effect switch 55*a* is set to OFF, "NULL" may be written in as the fifth and sixth keywords.

The seventh keyword on the list may be the keyword corresponding to the chorus effect 56. If the effect switch 56*a* is set to ON, "CHOR," which may be a keyword corresponding to the chorus effect 56, and a value of the rate 56*b* may be further appended to form the keyword. In the example shown in FIG. 4(*b*), the rate 56*b* is set to 70. Accordingly, the keyword "CHOR R70" may be written in as the seventh keyword on the list. The "R" preceding the parameter value (e.g., "70") may indicate that the value "70" corresponds to the rate 56*b*. When the effect switch 56*a* is set to OFF, "NULL" may be written in as the seventh keyword in the list.

The eighth and ninth keywords on the list may be the keywords corresponding to the reverb effect 57. When the effect switch 57*a* is set to ON, "REV," which may be the keyword corresponding to the reverb effect 57, and the effect type 57*b* selected may be further appended to form the keyword. In the example shown in FIG. 4(*b*), the effect switch 57*a* is set to ON and the plate effect type is selected as the effect type 57*b*. Accordingly, the keyword "REV PLATE" may be written in as the eighth keyword in the list.

Furthermore, the value 57*c* of the reverberation time may be the ninth keyword. In the example shown in FIG. 4(*b*) the value 57*c* (i.e., length) of the reverberation time is set to 1.2 seconds. Accordingly, the keyword "REV T1.2" may be written in as the ninth keyword in the list. Here, the "T" preceding the parameter value (e.g., "1.2") may indicate that the value "1.2" corresponds to the value 57*c* of the reverberation time. When the effect switch 57*a* is set to OFF, "NULL" may be written in as the eighth and ninth keywords in the list.

Accordingly, in some embodiments, the keyword list may be populated only with keywords that appropriately relate to the user-defined patch, thus presenting the user with only relevant candidate names for naming the user-defined patch. Consequently, candidate names that are not appropriately related to the user-defined patch are not presented, thus making it easier and quicker for the user to find an appropriate candidate name for naming the user-defined patch. Moreover, in some embodiments, the candidate names can be particularly detailed for user-defined patches that include distinct parameters. For example, a patch name, such as "DELAY1800" may appropriately name a user-defined patch that includes a delay time of 1800 ms.

FIGS. 5(*a*)-5(*d*) illustrate examples of screens displayed in a display device 11, for example during the Patch Setup mode and/or Patch Name Input mode, according to an embodiment of the present invention. The user can set up a new user-defined patch in the Patch Setup mode. As discussed, the Patch Setup mode may be entered into, for example, by operating the write button 27 while in the Play mode. Next, the user may press sequentially one or more effect setup button 31-39 (FIG. 2) corresponding to the effect the user wishes to set up for the patch.

FIG. 5(*a*) illustrates an example of a screen that may be displayed on the display device 11 when the effect setup button 31 (FIG. 2) corresponding to the OD/DS effect 51 (FIG. 3) is operated. In the first line in the screen, "U01-001" is displayed. "U" may indicate this is a user-defined patch, and "01-001" may indicate this is a first patch of a first group. In other words, the patch may be the first patch stored in a first group of user-defined patches.

The group number of a new user-defined patch may be the same group number of the last user-defined patch created, for example, the last user-defined patch created before the write button was operated to create the new user-defined patch. The number within the group may be the smallest number not yet assigned, for example. Similarly, when a preset patch has been selected (e.g., during the Play mode), "P01-001" may be displayed within the first line. "P" may indicate this is a preset patch, and "01-001" may indicate this is a first patch of a first group.

The second line of the screen may display the effect and the effect switch for toggling on and off the effect. In the example of FIG. 5(*a*), the effect is the overdrive/distortion effect as indicated by the "OD/DS," and the effect switch is set to "ON." The effect switch can be toggled, accordingly, for example, by operating the cursor button 22 (FIG. 2) to this line and then operating the dial 21 (FIG. 2) between "OFF" or "ON."

The third line of the screen may display the effect type. In the example of FIG. 5(*a*), the distortion effect type is selected and, accordingly, "DISTORTION" is displayed is shown. Other effect types may be selected, accordingly, for example, by operating the cursor button 22 (FIG. 2) to this line and then operating the dial 21 (FIG. 2) between "DISTORTION," "OVERDRIVE," and "FUZZ."

The fourth line of the screen may display effect parameters. In the example of FIG. 5(*a*), the numerical value of the drive is 50, the numerical value of the tone is 80, and the numerical value of the level is 35. The values of the effect parameters may be changed, accordingly, for example, by operating the cursor button 22 (FIG. 2) to each value and then operating the dial 21 (FIG. 2). Accordingly, other types of effects and their respective parameters may be set up in a similar manner to establish a patch. Thus, in some embodiments, a user-defined patch may be set up in the above-described manner, which may allow, for example, an effect (or multiple types of effects) to be provided accordingly to an inputted musical tone from an electric guitar or the like, to output a new sound.

Accordingly, a patch name may be assigned and edited to the user-defined patch set up in the above-described manner by entering the Patch Name Input mode, for example by operating the name button 29 (FIG. 2). When the name button 29 (FIG. 2) is operated, previously selected patch names may be displayed. In the example of FIG. 5(*b*), the patch "DISTORTION1" is displayed. In various embodiments, a cursor may be displayed under the first letter, "D" in the example of FIG. 5(*b*).

In such a state, the keywords stored in the list memory 8*a* (FIG. 1) may be displayed in order at or near the position of the cursor, for example, by operating the dial 21 (FIG. 2) while holding down the keyword button 23 (FIG. 2). In the example of FIG. 5(*c*), "DIST" (e.g., the first keyword in the keyword list in FIG. 4(*a*)) is inserted and displayed to the left of the position of the cursor as a negative image with flashing text to indicate that the keyword is a candidate (i.e., selectable, but not yet selected by the user). The text may continue to be displayed in this manner until the candidate keyword is selected at which point the text will be similar to the text of the patch name. The candidate keyword may be selected by operating the insert button 24 (FIG. 2), and accordingly the keyword may be applied where it is, and the keyword may be displayed as a positive image without flashing text. As such, this may indicate that the selected candidate keyword is confirmed to be used as a portion of the new patch name.

Furthermore, when the dial 21 (FIG. 2) is further operated the keyword having the second highest priority in the keyword list is displayed to the left of the position of the cursor as a negative image with flashing text to indicate that the keyword is a candidate (i.e., selectable, but not yet selected by the user), as shown in FIG. 5(*d*). In this example, the keyword with the second highest priority (as described in FIG. 4(*a*)) in the keyword list is "CLEAN" as shown in FIG. 5(*d*). Further operation of the dial 21 (FIG. 2) may display other keywords in the keyword list, such as "PHAS." In some embodiments, when the dial 21 (FIG. 2) is operated, any keywords stored as "NULL" may be ignored.

In some embodiments, the user may be able to delete a keyword (or otherwise lower a priority of the keyword) stored in the keyword list after the keyword has been used as a patch name. Because candidate keywords for naming a user-defined patch may be displayed based on a priority order, a user can quickly create an appropriate patch name for the user-defined patch.

As discussed, a user-defined patch is given a patch name in the manner described above and, when the write button 27 (FIG. 2) is operated, the patch name of the user-defined patch may be stored in the user memory 10*a* (FIG. 1).

Figure 6:
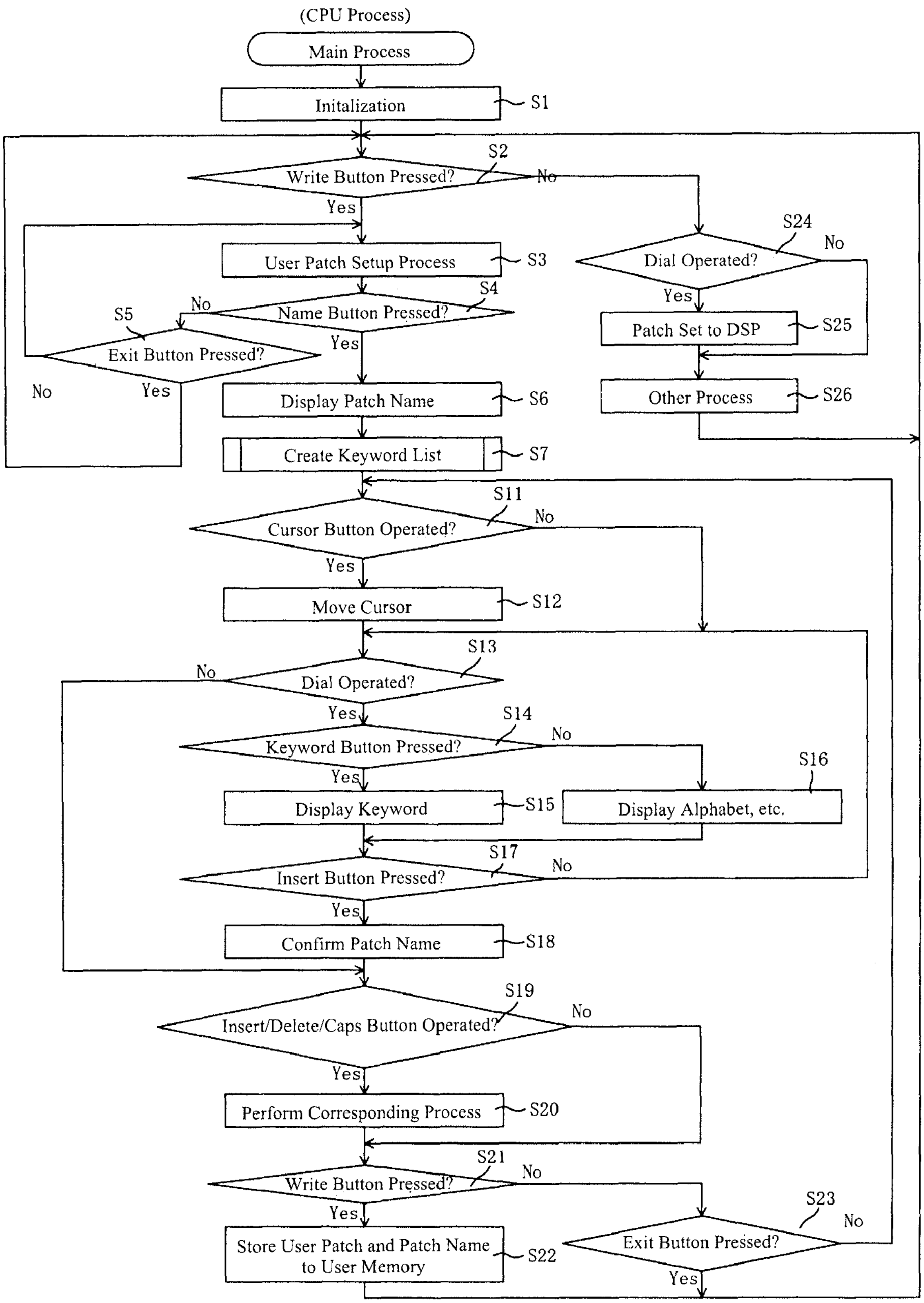
FIG. 6 is a flowchart illustrating a main process executed by a CPU according to an embodiment of the present invention.

FIG. 6 is a flow chart illustrating a main process executed by the CPU 7 (FIG. 1) in accordance with an embodiment of the present invention. With reference to FIGS. 1, 2, and 6, the main process may begin when power to the effect setting device 1 has been turned on, and may be repeatedly carried out until the power is turned off.

In step S1, initialization of the main process may occur. During the initialization, the effect setting device 1 may be set to the Play mode. In some embodiments, a last used patch before the power to the effect setting device 1 was turned off may be set to the DSP 4. Patches stored in the flash memory 10 may be retrieved when power is turned on to the effect setting device 1. Next in step S2, a determination may be made as to whether or not the write button 27 has been operated. In a case where the write button is operated (S2: Yes), the effect setting device 1 may switch to the Patch Setup mode to set a user-defined patch (step S3), as described with respect to FIG. 5(*a*).

Returning to FIGS. 1, 2, and 6, next in step S4, a determination may be made as to whether or not the name button 29 has been operated. In a case where the name button 29 has not been operated (S4: No), a determination may be made as to whether or not the exit button 28 has been pressed operated (step S5). In a case where the exit button 28 has been operated (S5: Yes), the process may return to step S2. Accordingly, the effect setting device 1 may be switched from the Patch Setup mode back to the Play mode. In a case where the exit button 28 is not operated (S5: No), the process may return to step S3.

In a case where the name button 29 is operated (S4: Yes), the effect setting device 1 may switch to the Patch Name Input mode and the display device 11 may display a current patch name (step S6). The patch name may correspond to the patch set at a start of the patch set up process (e.g., corresponding to the first effect button 31-39 operated) of step S3. As discussed, in the Patch Name Input mode, as described with respect to FIGS. 5(*b*) to 5(*d*), the effect setting device 1 may allow a user to edit and provide a particular patch name to a user-defined patch. With reference to FIGS. 1, 2, and 6, next in step S7, a keyword list may be created in the list memory 8*a* based on the user-defined patch stored in the RAM 8 set up during the user patch setup of step S3 while in the Patch Setup mode. A keyword list creation process will be described later with respect to FIGS. 7 and 8.

Returning to FIGS. 1, 2, and 6, next in step S11, a determination may be made as to whether or not the cursor button 22 has been operated. In a case where the cursor button 22 has been operated (S11: Yes), the position of the cursor may move accordingly (step S12). In a case where step S12 has been performed or the cursor button 22 has not been operated (S11: No), a determination may be made as to whether or not the dial 21 has been operated (step S13).

In a case where the dial 21 has been operated (S13: Yes), a determination may be made as to whether or not the keyword button 23 has been operated (step S14). In a case where the keyword button 23 is operated (S14: Yes), keywords stored in the list memory 8*a* may be displayed beside the cursor position based on their respective priorities (step S15). In some embodiments, a space may be inserted, and the displayed text may shift to the right of the inserted keyword. The display device 11 may indicate that the inserted keyword has not yet been selected, for example, the inserted keyword may be displayed as a negative image with flashing text.

On the other hand, in a case where the keyword button 23 has not been operated (S14: No), an alphabetic character or numeral may be displayed beside the cursor position (step S16). In some embodiments, the displayed text may shift to the right of the cursor position. The display device 11 may indicate that the inserted character or number has not yet been selected, for example, the inserted character or numeral may be displayed as a negative image with flashing text.

Upon completion of steps S15 or S16, a determination may be made as to whether or not the insert button 24 is operated (step S17). In a case where the insert button 24 is operated (S17: Yes), the keyword or character displayed as a negative image with flashing text may be selected and the keyword or character may be displayed normally (e.g., displayed with positive image without flashing text) and inserted in the patch name to confirm the patch name (step S18).

In a case where step S18 has been performed, or during step S13 the dial 21 is not operated (S13: No), a determination may be made as to whether any of the insert button 24, the delete button 25, and the caps button 26 is operated (step S19). In a case where any of the insert button 24, the delete button 25, and the caps button 26 is operated, a process corresponding to the operated button may be performed (step S20). For example, in a case where the insert button 24 is operated, a one-character space may be inserted at the cursor position. In a case where the delete button 25 is operated, the character of the cursor position may be deleted, and the character string of the remaining text may be shifted one character to the left. In a case where the caps button 26 is operated, the character of the cursor position may be switched to upper case or lower case.

In a case where step S20 has been performed, or during step S19 where none of the insert button 24, the delete button 25, and the caps button 26 is operated (S19: No), a determination may be made as to whether or not the write button 27 is operated (step S21). In a case where the write button 27 is operated (S21: Yes), the user-defined patch and the assigned patch name may be stored in the user memory 10*a* of the flash memory 10 (step S22). The process may return to step S2, and the effect setting device 1 may revert to the Play mode.

In a case where the write button 27 is not operated (S21: No), a determination may be made as to whether or not the exit button 28 is operated (step S23). In case where the exit button 28 is operated (S23: Yes), the process may return to step S2 without storing the user-defined patch and the assigned patch name in the user memory 10*a* of the flash memory 10, and the effect setting device 1 may revert to the Play mode. In a case where the exit button 28 is not operated (S23: No), the process may return to step S11 to continue setting the patch name.

If during step S2, the write button 27 is not operated (S2: No), a determination may be made as to whether or not the dial 21 is operated (step S24). In a case where the dial 21 is operated (S24: Yes), the patch selected with the dial 21 may be set to the DSP 4 (step S25), for example to allow the DSP to apply the patch and the corresponding multiple types of effects to an inputted music signal. In a case where step S25 has been performed, or the dial 21 is operated (S24: No), other process(es) may be performed (step S26), and then the process may return to step S2. The other process(es) may include, for example, a determination as to whether or not the pedal is operated.

The keyword list creation process is explained with reference to FIGS. 7 and 8, which are flowcharts illustrating keyword list creation processes executed by the CPU 7 (FIG. 1) according to an embodiment of the present invention. In particular, FIG. 7 may correspond to step S7 in FIG. 6.

With reference to FIGS. 1-3 and 7, first in step S31, a variable i may indicate the effect set. For example, i may be equal to 1. The variable i may correspond to the type of effect. The variable i may be numbered according to the priority for each of the types of effects. For example, an OD/DS effect 51 having a highest priority may correspond to i=1, and an amp simulator effect 52 having a second highest priority may correspond to i=2, and so on.

Next in step S32, a determination may be made as to whether or not the effect setting device 1 includes an effect switch corresponding to the effect i. For example, in FIG. 3, the OD/DS effect 51 has the highest priority (i.e., i=1) and has an effect switch 51*a*, whereas the pedal effect 53 has the third highest priority (i.e., i=3) and does not have an effect switch. Returning to FIGS. 1-3 and 7, in a case where the effect setting device 1 includes an effect switch corresponding to the effect i (S32: Yes), a determination may be made as to whether or not the effect switch is set to ON (step S33). In a case where the effect switch is set to ON (S33: Yes), or the effect setting device 1 does not include an effect switch corresponding to the effect i (S32: No), a determination may be made as to whether or not an effect type is provided (step S34). For example, in FIG. 3, the OD/DS effect 51 has the highest priority (i.e., i=1) and has effect types 51*b* (e.g., overdrive, distortion, fuzz) for selecting.

Returning to FIG. 7, in a case where the effect type is provided (S34: Yes), a determination may be made as to whether or not the effect type is customized (step S35). For example, in FIG. 3, the amp simulator effect 52 has the second highest priority (i.e., i=2) and has custom effect types 52*g* (e.g., combo, stack, small). Returning to FIGS. 1-3 and 7, in a case where the effect type is not customized (S35: No), a determination may be made as to whether or not the keyword corresponding to the effect type is stored in the keyword memory 9*b* (step S36). In other words, a determination may be made as to whether the effect type has a keyword stored in the keyword memory 9*b* (e.g., stored by the manufacturer).

In a case where the keyword corresponding to the effect type is stored in the keyword memory 9*b* (S36: Yes), the keyword may be written in as the i-th keyword in the keyword list in the list memory 8*a* (step S37), for example as shown in FIG. 4(*a*), where the first keyword (i.e., i=1) corresponds to the effect type "DIST." Returning to FIGS. 1-3 and 7, in a case where the effect type is customized (S35: Yes), a keyword corresponding to the effect type may be read from the keyword memory 9*b*, and the keyword may be written in as the i-th keyword in the keyword list in the list memory 8*a* (step S38).

In a case where, during step S33, the effect switch is set to OFF (S33: No), the effect type is not provided (S34: No), or the keyword corresponding to the effect type is not stored in the keyword memory 9*b* (S36: No), "NULL" may be written in as the i-th keyword in the keyword list in the list memory 8*a* (step S39).

In a case where step S37, step 38, or step 39 have been performed, the variable i may be increased by 1 (step S41). Next in step S42, a determination may be made as to whether or not the delay effect 55 is the i-th effect. In a case where the i-th effect is not the delay effect 55 (S42: No), the keyword list creation process may return to step S32. In other words, a portion of the keyword list creation process may be repeated for all the effects having priorities greater than the priority of the delay effect 55. For example, with reference to FIGS. 3, 4 and 7, the steps S32 to S42 may be repeated four times since there are four effects with higher priorities (e.g., the OD/DS effect 51, the amp simulator effect 52, the pedal effect 53, and the FX effect 54) than the priority of the delay effect 55, which is 5 in this example.

Returning to FIGS. 1-3 and 7, in a case where the i-th effect is the delay effect 55 (S42: Yes), a determination may be made as to whether or not the keywords written in the keyword list up to this point are all "NULL" entries. In a case where the keywords written to the keyword list are all "NULL" (S43: Yes), the keyword list creation process for a space system may be performed (step S48), and will be discussed in more detail with reference to FIG. 8.

With reference to FIGS. 1-3 and 7, in a case where any of the keywords written in the keyword list is not "NULL" (S43: No), a determination may be made as to whether or not the effect switch 55*a* of the delay effect 55 is set to ON (step S44). In other words, in such embodiments, so long as at least one keyword in the keyword is not "NULL" the keyword list creation process may continue to step S44 to continue set up of the keyword list creation process for an effect, as opposed to entering a keyword list creation process for an effect of a space system (refer to step S48 and FIG. 8 discussed later).

In a case where the effect switch 55*a* of the delay effect 55 is set to ON (S44: Yes), a determination may be made as to whether or not the delay time 55*b* is set to equal or exceed a specified period of time, such as 1000 ms or any other suitable amount of time (step S45). In a case where the delay time 55*b* equals or exceeds 1000 ms (S45: Yes), the keyword "DELAY" and the delay time 55*b* may be appended together and may be written in the keyword list as the appropriately numbered keyword, for example the fifth keyword in a case where i=5 and the delay effect is the fifth effect (step S46).

In a case where the effect switch 55*a* is not set to ON (S44: No) or the delay time 55*b* does not equal or exceed 1000 ms (S45: No), "NULL" may be written in the keyword list as the appropriately numbered keyword, for example as discussed above, the fifth keyword (step S47). Once steps S46, S47, or S48 have been performed, the keyword list creation process may return to the main process of FIG. 6.

Figure 7:
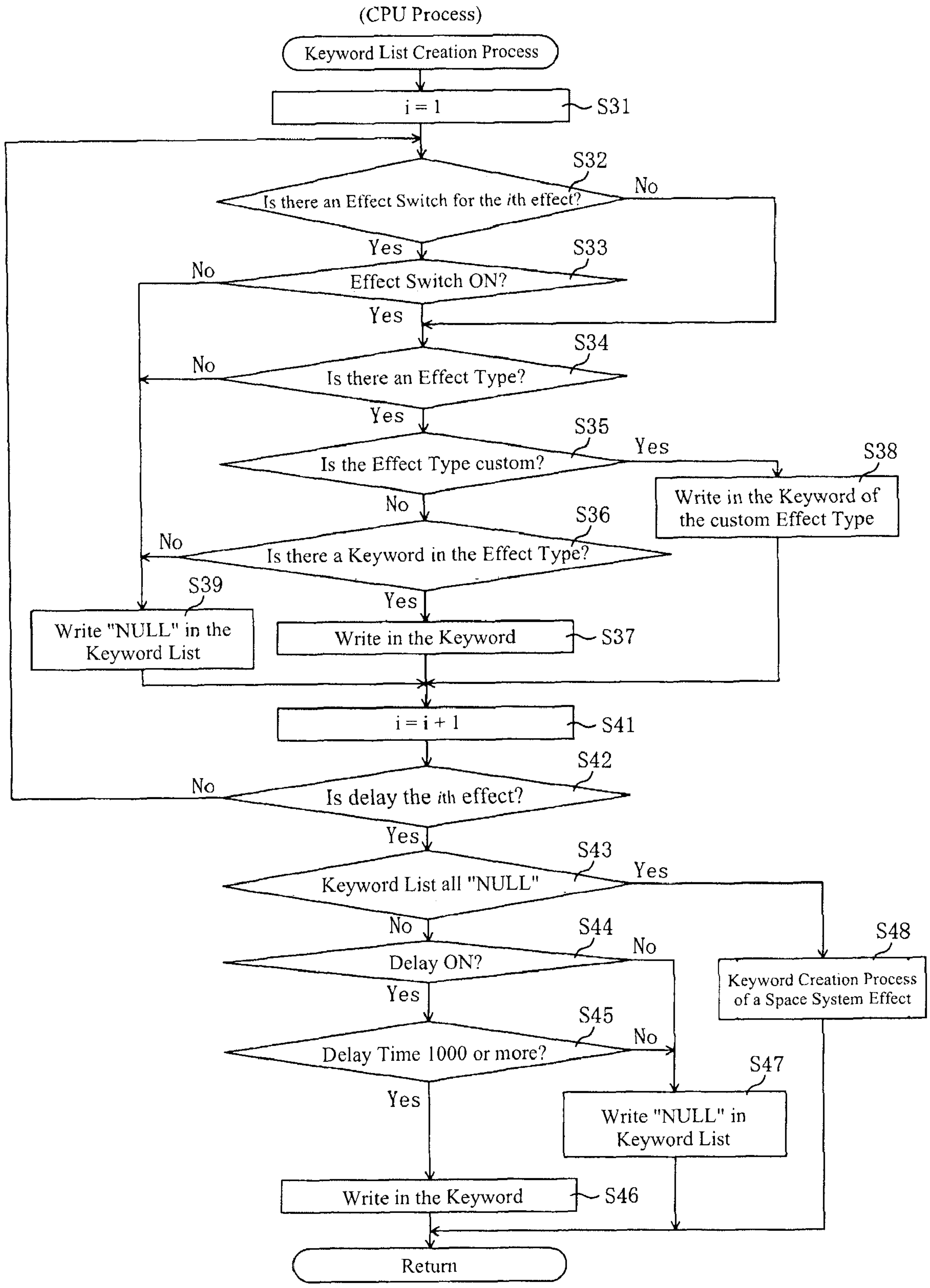
FIG. 7 is a flowchart illustrating a keyword list creation process executed by a CPU according to an embodiment of the present invention.
Figure 8:
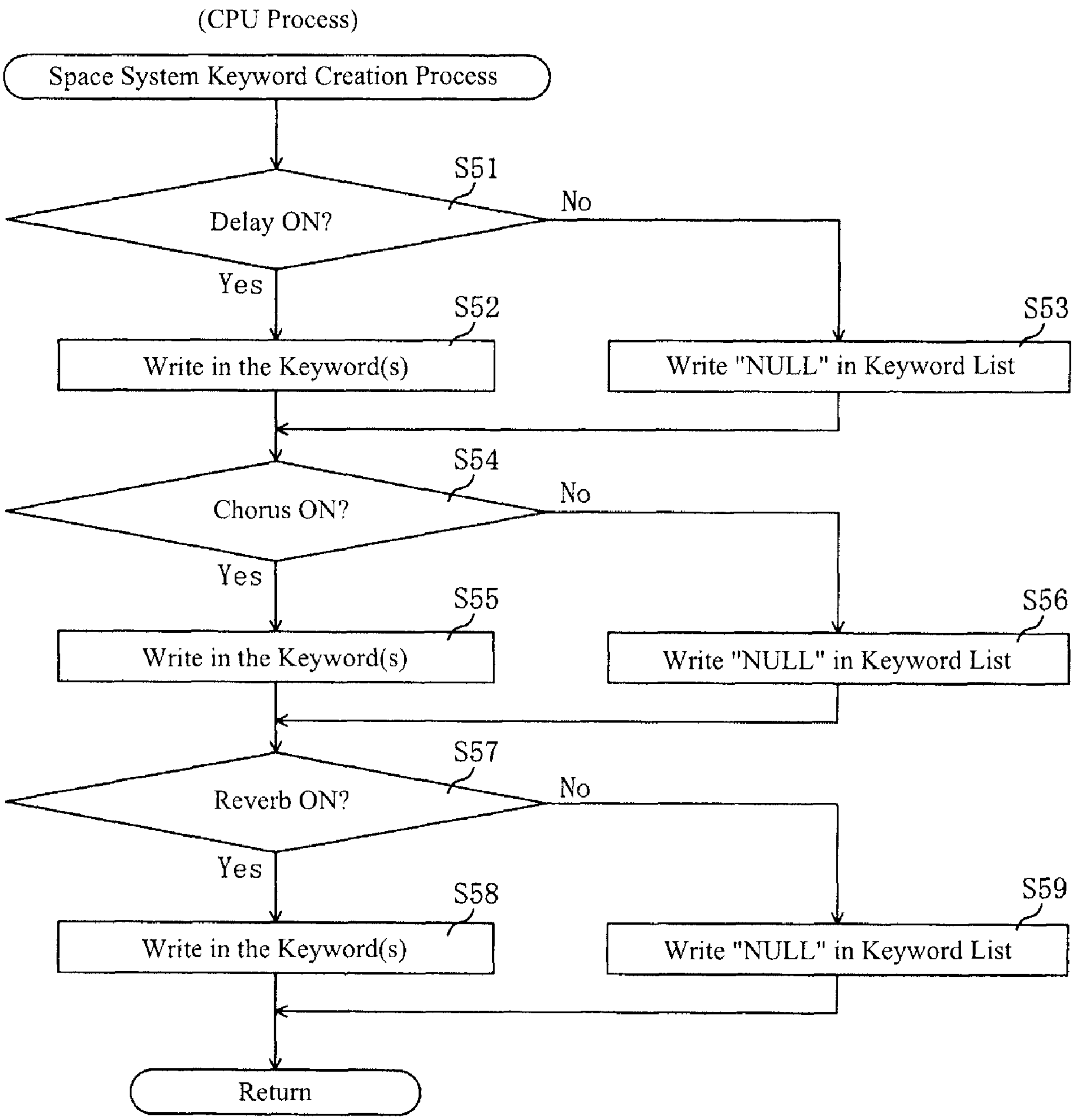
FIG. 8 is a flowchart illustrating a keyword list creation process of a space system effect according to an embodiment of the present invention.

FIG. 8 may be a flowchart illustrating a keyword list creation process of a space system effect and may correspond to step S48 in FIG. 7. With reference to FIGS. 1-3 and 8, first in step S51, a determination may be made as to whether or not the effect switch 55*a* of the delay effect 55 is set to ON.

In a case where the effect switch 55*a* of the delay effect 55 is set to ON (S51: Yes), the keyword "DELAY" and the delay time are appended and written to the keyword list as the appropriately numbered keyword, for example the fifth keyword (step S52). This may be the case regardless of the delay time 55*b* (e.g., delay time 55*b*=500 ms or delay time 55=1500). Furthermore, the value 55*c* of the level may be written to the keyword list as the next keyword (e.g., the sixth keyword) (step S52). In a case where the effect switch 55*a* of the delay effect 55 is set to OFF (S51: No), the keywords (e.g., the sixth and seventh keywords) may be written to the keyword list as "NULL" (step S53).

Next in step S54, a determination may be made as to whether or not the effect switch 56*a* of the chorus effect 56 is set to ON. In a case where the effect switch 56*a* is set to ON (S54: Yes), the keyword "CHOR" and the rate 56*b* may be written to the keyword list as the next keyword in the keyword list, for example, the seventh keyword (step S55). In a case where the effect switch 56*a* of the chorus effect 56 is set to OFF (S54: No), the keyword in the keyword list may be written in as "NULL" (step S56).

Next in step S57, a determination may be made as to whether or not the reverb 57 effect switch 57*a* is set to ON. In a case where the effect switch 57*a* is set to ON (S57: Yes), the keyword corresponding to keyword "REV" and the type 57*b* of the reverb effect 57 are regarded as the next keyword (e.g., the eighth keyword) in the keyword list (step S58). Furthermore, the keyword "REV" and the reverberation time 57*c* may be regarded as the following keyword (e.g., the ninth keyword) in the keyword list (step S58). In a case where the effect switch 57*a* of reverb 57 is set to OFF (S57: No), the keywords are written to the keyword list as "NULL" (step S59). Upon completion of steps S58 or S59, the keyword creation process for the space system effect may return to the main process.

In some embodiments, a keyword may be extracted based on a state or mode set to a user-defined patch, for example, as explained above with reference to FIGS. 7 and 8. When the effect type is selected, the keyword corresponding to the effect type stored in the keyword memory 9*b* may be written to the keyword list.

With reference to FIGS. 1-8, in some embodiments, when a parameter, such as the delay time 55*b*, equals or exceeds a prescribed value (e.g., 1000 ms), a keyword may be written to the keyword list, and when the parameter does not equal or exceed the prescribed value, "NULL" may be written into the keyword list.

In some embodiments, when any effect of a musical instrument system has been set, a keyword concerning an effect of a space system is not created, whereas when an effect of a musical instrument system is not set (i.e., none of the effects set), a keyword relating to an effect of a space system may be created in the keyword list. Accordingly, a keyword list may be created that corresponds to the modes of the multiple types of effects set as a user-defined patch. Thus in some embodiments, a keyword unrelated to a user-defined patch is not written to the keyword list, and keywords relating to remarkable distinctive effects may be written into the keyword list.

In some embodiments, keywords corresponding to the multiple types of effects that have been set up as a user-defined patch may be candidate names for naming the user-defined patch. Consequently, a keyword that is unrelated to the user-defined patch is not displayed, thus allowing the user to set up a patch name for the user-defined patch efficiently and quickly. For example, a previously-defined patch (e.g., a previously user-defined patch or a preset patch) may be given a new patch name according to that described above. Similarly, a new user-defined patch name may be created and named based on the keywords related to the new user-defined patch.

In various embodiments, a new patch name can replace or be added to an old patch name in its entirety, or the new patch name can replace or be added to a portion of the old patch name.

In various embodiments, more than one keyword may be stored in the keyword memory 9*b*. A keyword from the more than one keyword may be selected by the user. Such embodiments, may present the user with alternative ways of describing an effect type. For example, "DS," "DIST," and/or "DISTORTION" may be stored in the keyword memory, and the user can select the keyword most suitable to his or her tastes.

In various embodiments, the keywords in the keyword memory 9*b* and the list memory 8*a* serve for exemplary purposes only; any keyword may be used. For example, the distortion effect may have keywords that are abbreviated or in full, such as "DS," "DIST," "DISTORTION," or in any other suitable manner, such as a numeric value or in a foreign language, or the like.

In some embodiments, when the keyword candidates are displayed, for example, in FIGS. 5(*b*)-5(*d*), only one keyword is displayed at a time on the display device 11. In other embodiments, multiple keywords may be displayed on the display device 11 at any appropriate location. For example, the display device 11 may display all or some of the keywords in the keyword list within the list memory 8*a* (FIG. 1), which may allow the user to select one of the displayed candidate keywords and/or further operate the effect setting device 1 (FIG. 1) to list additional keywords. Similarly, for example, keywords with higher priorities may be displayed in upper position of the candidate keywords on the display device 11.

With reference to FIGS. 1 and 3, in some embodiments, priority is based on the effect (e.g., the OD/DS effect 51 has a higher priority than the amp simulator effect 52). In other embodiments, priority may be based on parameters of the effects, or any other suitable indicia. For example, the priority rank of the delay effect 55 may be lower than the pedal effect 53 and the FX effect 54 in a case where the delay time 55*b* (i.e., a parameter of the delay effect 55) is 1000 to 1300 ms. The priority rank of the delay effect 55 may be lower than the pedal effect 53, but higher than the FX effect 54 in a case where the delay time 55*b* (i.e., a parameter of the delayed effect 55) is 1400 to 1600 ms. The priority may be higher than the pedal effect 53, for example, when the delay time 55*b* is 1700 ms or more.

Such embodiments may be accomplished with multiple tables, for example, to decide the priority order. The tables may be located in the ROM 9 for example, or any other suitable location. Similarly, the ROM 9 or any other suitable part of the effect setting device 1 may include a program for assigning and/or determining priorities of keywords relating to the user-defined patches. In further embodiments, priority orders may be changed based on the set modes of a patch.

In various embodiments, the candidate keywords may be extracted from other user-defined patches—that may be in the same group as a new user-defined patch or a different group—as opposed to or in addition to being generated when the new user-defined patch is set up.

In some embodiments, when the delay time 55*b* of the delay effect 55 is 1000 ms or more, the keyword may be "DELAY" appended with the delay time 55*b*. In other embodiments, the delay time 55*b* need not be appended, and thus "DELAY" may be the keyword. The same may be true for an effect type that may be appended to some parameter value.

In some embodiments, the reverb effect 57 may be set up like the delay effect 55 in that the reverberation time 57*c* has to meet or exceed a prescribed time (e.g., 2 seconds) in order for a keyword to be assigned.

Some embodiments may include a harmony effect that may add a musical note of a pitch separated only a prescribed interval to an inputted musical note, where the harmony effect may include parameters, such as a key, a pitch, and the like. In such embodiments, keywords relating to the parameters may be used. For example, the key may have a keyword such as "Cmaj" and the interval as "3rd."

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. An effect setting device, the device comprising:

circuitry configured to provide one or more types of effects to an inputted music signal;

a first control for setting a patch including the one or more types of effects to be provided by the circuitry to the inputted music signal, the patch associated with multiple candidate keywords created according to the one or more types of effects to be provided by the circuitry;

a display device configured to display at least one of the multiple candidate keywords for selection by a user;

a second control for providing a patch name to the patch, the patch name including a candidate keyword selected by the user from the multiple candidate keywords created according to the one or more types of effects to be provided by the circuitry; and a storage device for storing the patch and the patch name;

the circuitry configured to provide the one or more types of effects to the inputted music signal based on the patch stored in the storage device.

2. The device of claim 1, the second control further configured to select a desired patch name from a plurality of patch names stored in the storage device;

wherein the circuitry is configured to provide one or more types of effects to the inputted music signal based on the patch corresponding to the desired patch name.

3. The device of claim 1, wherein the storage device comprises flash memory.

4. The device of claim 1, the device further comprising:

a storage element for storing an effect type name corresponding to each of the one or more types of effects.

5. The device of claim 4, wherein the effect type names are stored in the storage element during manufacture of the effect setting device.

6. The device of claim 1, the first control further configured to selectively toggle on and off at least one of the one or more types of effects; and the display device configured to selectively display candidate keywords corresponding to types of effects that are toggled on by the first control.

7. The device of claim 1, wherein each of the multiple candidate keywords associated with the patch correspond to a respective one or more types of effects.

8. The device of claim 1, the first control further configured to set a parameter for setting a configuration of the patch.

9. The device of claim 8, wherein the multiple candidate keywords are based on the parameter.

10. The device of claim 8, the storage device further configured to store the parameter.

11. The device of claim 8, the circuitry configured to provide the one or more types of effects to the inputted music signal based on the patch stored in the storage device and the parameter.

12. The device of claim 8, wherein a candidate keyword is only associated with the patch when the parameter meets or exceeds a prescribed parameter.

13. The device of claim 8, wherein a candidate keyword corresponds to the parameter.

14. The device of claim 1, each of the multiple candidate keywords having a respective priority;

wherein the multiple candidate keywords are displayed based on the respective priority of each of the multiple candidate keywords.

15. The device of claim 1, the circuitry further configured to provide the inputted music signal with the one or more types of effects as an output signal.

16. The device of claim 1, the second control further configured to select the candidate keyword from the multiple candidate keywords.

17. The device of claim 1, the second control for defining at least some of the multiple candidate keywords.

18. The device of claim 1, wherein the one or more types of effects provided to the inputted music signal changes the inputted musical signal accordingly.

19. The device of claim 1, the second control for creating at least some of the multiple candidate keywords based on a currently selected one of the one or more types of effects to be provided by the circuitry.

20. A method for an effect setting device, the method comprising:

establishing a patch including one or more types of effects;

associating the patch with multiple candidate keywords created according to the one or more types of effects;

displaying at least one of the multiple candidate keywords for selection by a user;

providing a patch name to the patch, the patch name including a candidate keyword selected by the user from the multiple candidate keywords created according to the one or more types of effects;

storing the patch and the patch name in a storage device; and providing the one or more types of effects to an inputted music signal based on the patch stored in the storage device.

21. The method of claim 20, the method further comprising:

creating at least some of the multiple keywords based on the one or more types of effects of the patch.

* * * * *